(12) United States Patent
Xiao

(10) Patent No.: US 7,849,338 B2
(45) Date of Patent: Dec. 7, 2010

(54) COMMUNICATION DEVICE AND METHOD FOR SAVING STATIC POWER CONSUMPTION OF COMMUNICATION DEVICE

(75) Inventor: Ruijie Xiao, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 642 days.

(21) Appl. No.: 11/834,758

(22) Filed: Aug. 7, 2007

(65) Prior Publication Data

US 2008/0059821 A1 Mar. 6, 2008

Related U.S. Application Data

(63) Continuation of application No. PCT/CN2006/002086, filed on Aug. 17, 2006.

(30) Foreign Application Priority Data

Aug. 22, 2005 (CN) .................... 2005 1 0090939

(51) Int. Cl.
*G06F 1/00* (2006.01)
*G06F 1/26* (2006.01)
*G06F 1/32* (2006.01)

(52) U.S. Cl. .................... 713/320; 713/300; 713/324

(58) Field of Classification Search ............... 713/300, 713/320, 324
See application file for complete search history.

(56) References Cited

U.S. PATENT DOCUMENTS

| 4,484,028 | A | * | 11/1984 | Kelley et al. ............. 379/93.14 |
| 5,754,870 | A | * | 5/1998 | Pollard et al. ................ 713/323 |
| 5,956,323 | A | * | 9/1999 | Bowie ........................ 370/241 |
| 6,208,670 | B1 | * | 3/2001 | Milliron et al. ............. 370/540 |
| 6,480,487 | B1 | * | 11/2002 | Wegleitner et al. .......... 370/354 |
| 6,597,689 | B1 | * | 7/2003 | Chiu et al. ................... 370/354 |
| 6,757,268 | B1 | * | 6/2004 | Zendle ........................ 370/338 |
| 6,799,279 | B1 | | 9/2004 | Okamoto et al. |

(Continued)

FOREIGN PATENT DOCUMENTS

CN 1282190 A 1/2001

(Continued)

OTHER PUBLICATIONS

G.992.2, Splitterless Asymmetric digital Subscriber Line (ADSL) Transceivers, ITU-T, Jun. 30, 1999, pp. 93-99.

(Continued)

*Primary Examiner*—Mark Connolly
(74) *Attorney, Agent, or Firm*—Conley Rose, P.C.; Grant Rodolph

(57) ABSTRACT

A communication device and a method for saving static power consumption of communication device are disclosed. The communication device mainly includes a plurality of service units; and a power control circuit, cutting off power supply of at least one service unit of the plurality of service units according to a control signal. The method mainly includes: receiving a control signal; cutting off power supply of at least one service unit in the communication device according to the control signal. According to the scheme, power supply of at least one service unit of the communication device may be cut off according to application requirements, to save the static power of the device, and reduce the static power consumption of the wideband parts of Integrated Voice Data (IVD) line card.

22 Claims, 6 Drawing Sheets

U.S. PATENT DOCUMENTS

| | | | |
|---|---|---|---|
| 6,952,785 B1 * | 10/2005 | Diab et al. | 713/300 |
| 2005/0152300 A1 * | 7/2005 | Edsberg | 370/316 |
| 2007/0214372 A1 * | 9/2007 | Doyon et al. | 713/300 |

FOREIGN PATENT DOCUMENTS

| | | | |
|---|---|---|---|
| CN | 1499881 A | | 5/2004 |
| CN | 1555206 A | | 12/2004 |
| EP | 1207673 A1 | * | 5/2002 |
| JP | 5-327587 A | | 12/1993 |
| JP | 2000-253587 A | | 9/2000 |
| WO | WO 99/07162 A1 | | 2/1999 |
| WO | WO 00/62429 A2 | | 10/2000 |

OTHER PUBLICATIONS

Foreign communication from a counterpart application, Chinese application 200680012253.4, Office action dated May 12, 2010, 5 pages.

Foreign communication from a counterpart application, Chinese application 200680012253.4, Partial English Translation Office action dated May 12, 2010, 2 pages.

\* cited by examiner

| IVD Work Mode | Con1/Con 2 | Power Con Cirl/Cir2 | POWER Save (static state) |
|---|---|---|---|
| Combo Mole | 0/0 | output/output | 0% |
| ADSL Only Mole | 0/1 | output/close | 30% |
| POTS Only Mode | 1/0 | close/output | 70% |

COMMUNICATION DEVICE AND METHOD FOR SAVING STATIC POWER CONSUMPTION OF COMMUNICATION DEVICE

CROSS REFERENCE TO RELATED APPLICATIONS

This application is a continuation of PCT application no. PCT/CN2006/002086 filed Aug. 17, 2006 and entitled "A Communication Apparatus and a Method for Saving Static Power Consumption of the Communication Apparatus," which claims priority to Chinese patent application no. 200510090939.2 filed Aug. 22, 2005.

FIELD OF THE INVENTION

The present invention relates to communication field, and more particularly, to a communication device and a method for saving static power consumption of the communication device.

BACKGROUND OF THE INVENTION

Digital Subscriber Line (xDSL, such as Asymmetric DSL, Very high data rate DSL, etc.) is used in point-to-point transmission technology, using copper twisted-pairs as transmission media. The DSL technology supports both symmetric and asymmetric transmission modes in subscriber loops of traditional POTS (a plain old telephone service), so that a transmission bottleneck of the "last kilometer" often happening between a network service provider and an end subscriber is solved. Because the xDSL provides high-bandwidth services by employing copper twisted-pairs, the investments of operators are effectively guaranteed to be returned, and the subscribers are provided with wideband services. Accordingly, the xDSL is well developed all over the world.

Asymmetric Digital Subscriber Line (ADSL) is a type of the xDSL, which is appropriate for transmitting asymmetric data streams used in personal wideband access services, wherein the amount of data of downlink streams (from a Customer Premise Equipment, CPE, to a Central Office, CO) of a personal wideband access services is extremely larger than that of uplink (from the CO to the CPE) streams. The ADSL has overpowering advantages in personal wideband access applications. Till now, more than 50,000,000 subscribers enjoy multimedia services provided by the ADSL, such as high-speed net-surfing, video services. ADSL service providers develop a new "gold mine" on the twisted-pair, making the ADSL services become another important income source besides the POTS.

According to the growing bandwidth demands of the subscribers, an access technology providing higher bandwidth and more flexible allocation of uplink and downlink bandwidths, such as the Very high data rate DSL (VDSL), is applied. Another widely used DSL technology is Single Line High Data Rate Digital Subscriber Line (G.SHDSL). The G.SHDSL is more often used by business consumers because it can provide asymmetric services.

All of the ADSL, ADSL2+ (second generation ADSL), and the VDSL employ frequencies higher than that used in traditional telephone signals (below 3.4 KHz). The frequency range of the ADSL is 25,875 KHz~1104 KHz, the frequency range of the ADSL2+ is 25.875 KHz~2208 KHz, and the frequency range of the VDSL may be 25 KHz~30 MHz. As transmitting on different frequency bands, the xDSL and the POTS services can transmit in one telephone line. The mixed signals of the xDSL and the POTS services can be separated by filters set in transceivers on both ends of the telephone line. A system model of an ADSL can be referred to as a Splitter. In the system, a DSL Access Multiplexer (DSLAM) is included. The DSLAM can provide multi-path ADSL services or VDSL services.

According to the rapidly growing applications of xDSL, the amount of xDSL lines is closer to the amount of POTS lines, and may be nearly the same as that of the POTS lines eventually. The complexity, difficulty and maintenance cost of networking of the xDSL will be greatly increased if the networking mode is the same to that shown in FIG. 1. Thus, a new networking mode, that is an Integrated Voice Data (IVD) networking mode, has been employed by operators.

The IVD networking mode is shown in FIG. 2. The IVD networking system mainly includes an IVD line card set in a Multiple Services Access Node (MSAN). The IVD line card includes an xTU-C (xDSL CO unit), a POTS (traditional telephone service) process unit, and a Low Pass Filter (LPF). The IVD line card supports POTS transmission process of xDSL service. There are a series of advantages of the IVD networking mode, such as low stock cost, low networking complexity, low maintenance cost, and so on. Accordingly, the IVD networking mode may become a primary mode in the next generation network. However, a series of difficulties and problems will be brought by the use of the IVD networking. For example, the power consumption of device is relatively high. At the early stage, when the utilization ratio of xDSL line is rather low, the problem of high power consumption is much more noticeable.

As shown in FIG. 1, the DSLAM employs a centralized multiplexing mode. In this mode, the density of the utility of the DSLAM device can be increased gradually according to the increase of number of subscribers. The average utilization ratio of the DSLAM device is relatively high, and the power consumption is relatively low. A schematic diagram illustrating a relationship between the networking scale and the port utilization ratio in the DSLAM networking mode is as shown in FIG. 3.

As shown in FIG. 2, in an IVD networking mode of Multiply Service Access Node (MSAN), all wideband ports should be deployed along with narrowband ports at one time. At the early stage of networking, the ratio of wideband subscribers to narrowband subscribers is relatively low, and the power consumption of wideband part is relatively high. FIG. 4 shows the networking scale and the port utilization ratio of the IVD networking mode. The static power consumption is rather high at the early stage of networking using the IVD mode. For example, in a typical 32ch IVD, the static power consumption of 32ch POTS is around 3 W, while the static power consumption of 32ch ADSL is near 10 W when the ADSL is inactive. In an extreme case, the IVD is only used as a POTS, the power consumption of the IVD is 4 times of that of a PSTN device. The higher power consumption is obviously contrary to the operator's objective of saving network's power.

Implementations for reducing power consumption are provided currently. A method for saving power of xDSL lines in existing art includes the application of L2/L3 low power consumption mode, Power management (port power management), Power cutback, and so on.

The inventor found in the inventing process that the methods for saving power for xDSL lines in the existing art just concentrate on how to save power when the xDSL lines are active, and no feasible solution is given for saving the static power consumption when the xDSL lines are inactive.

SUMMARY OF THE INVENTION

Embodiments of the present invention provide a communication device and a method for saving static power of communication device, so as to effectively reducing the static power consumption when the xDSL line is inactive.

An embodiment of the present invention provides a communication device. The communication device includes a plurality of service units and a power control circuit, the power control circuit is used for cutting off power supply of at least one service unit of the plurality of service units according to a control signal.

An embodiment of the present invention provides a method for saving static power consumption of a communication device. The method includes receiving a control signal; and cutting off power supply of at least one service unit in the communication device according to the control signal.

It can be seen from the technical solution provided by the present invention that, power supply of at least one service unit of a communication device can be cut off according to a control signal, so the static power consumption of the communication device can be saved.

DETAILED DESCRIPTION OF THE INVENTION

Embodiments of the present invention provide a communication device and a method for saving static power consumption of communication device. A power control circuit is used to control power supply of the communication device or service units of the communication device, i.e. power supply of some service units (including independent circuit modules of the service units) is controlled to be cut off to save the static power consumption.

An application embodiment in an IVD line card of the present invention includes a power control circuit. The power control circuit is set at the input point of the power supply of the IVD line card or independent modules in the IVD line card; power supply of a wideband circuit module or a narrowband circuit module of the IVD line card can be cut off under the control of the power control unit if necessary. Therefore, the static power of the IVD line card the IVD line card or other similar communication devices, to reduce the static power consumption.

Figure 1:
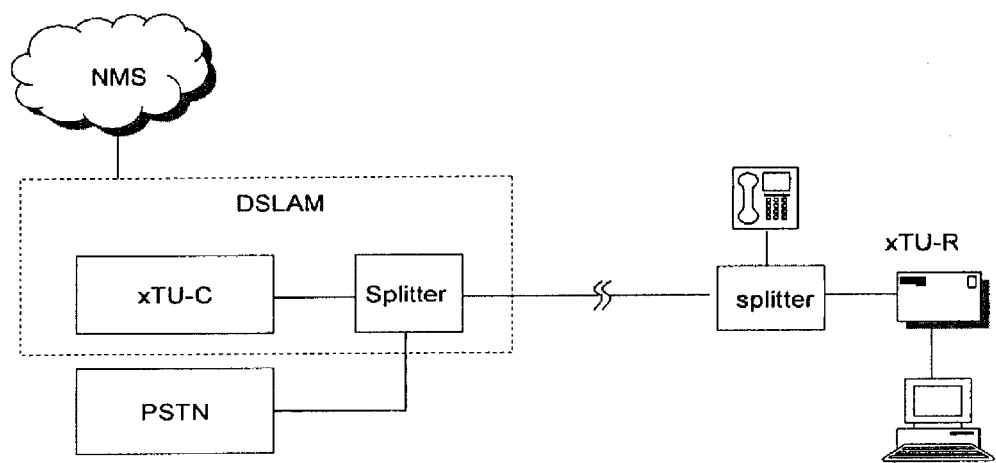
FIG. 1 is a schematic diagram illustrating a system model of ADSL and VDSL.
Figure 2:
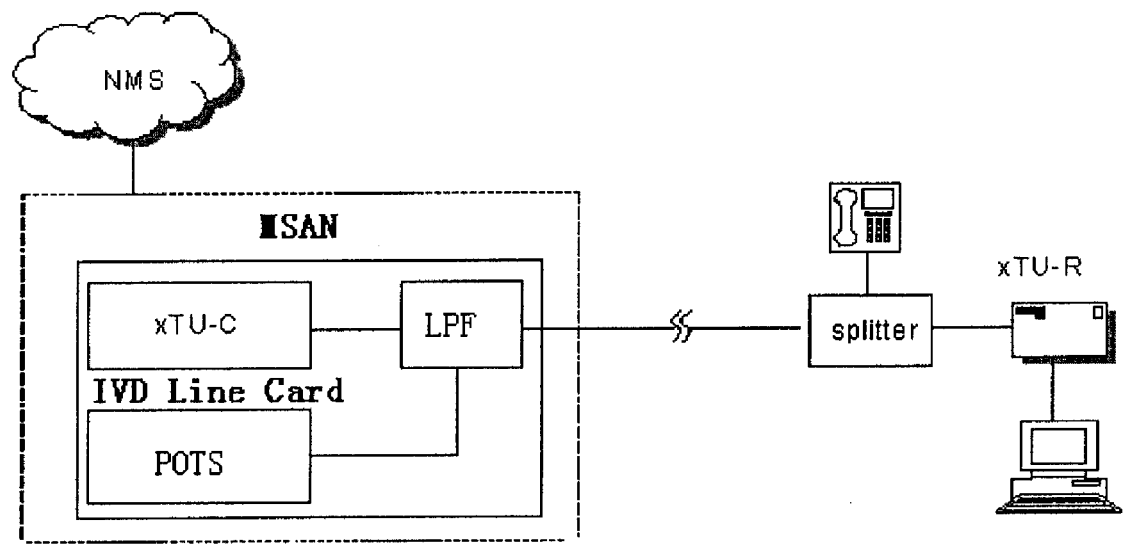
FIG. 2 is a schematic diagram illustrating an IVD networking mode.
Figure 3:
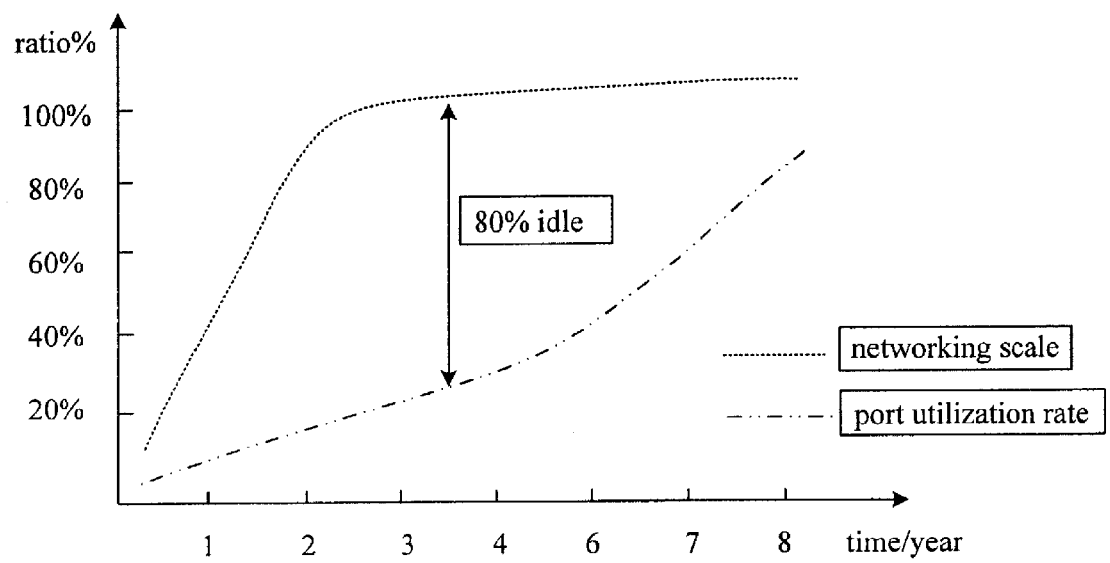
FIG. 3 is a schematic diagram illustrating networking scale and port utilization ratio in the DSLAM networking mode.
Figure 4:
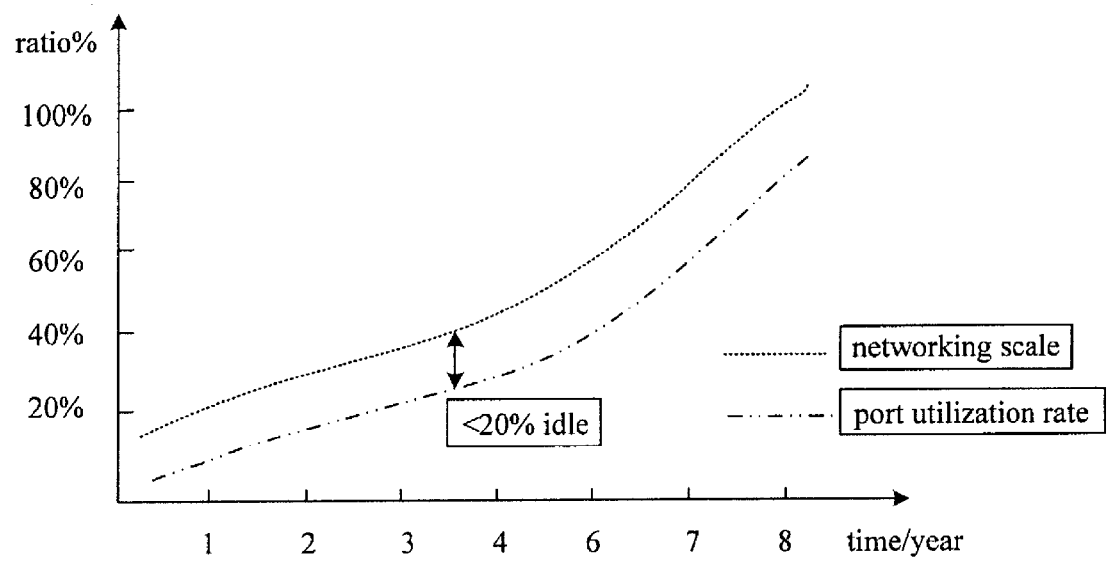
FIG. 4 is a schematic diagram illustrating networking scale and port utilization ratio in the IVD networking mode.
Figure 5:
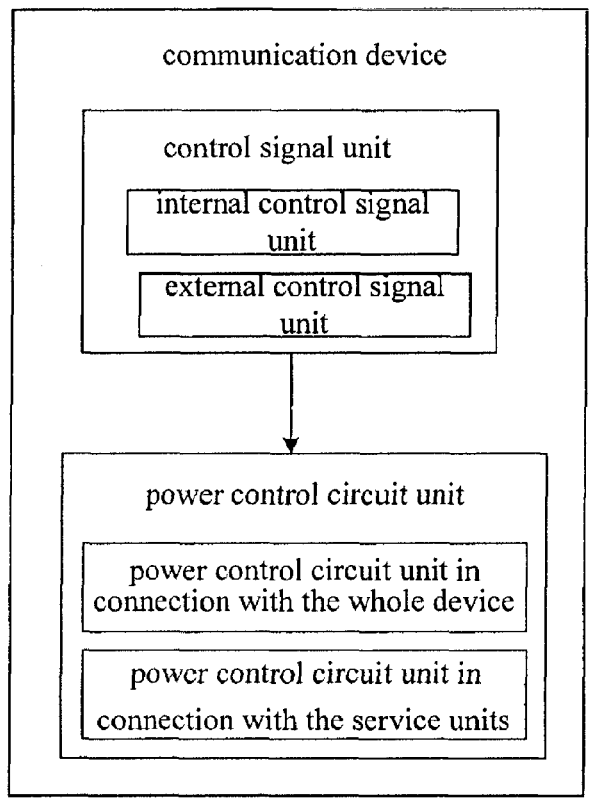
FIG. 5 is a schematic diagram illustrating the structure of a communication device according to an embodiment of the present invention.

Specific description will be given with reference to the embodiments and the accompany drawings. FIG. 5 is a schematic diagram illustrating the structure of a communication device according to an embodiment of the present invention. The communication device mainly includes a power control circuit, and the power control circuit includes a control signal unit and a power control unit.

The control signal unit is used to transmit a control signal to the power control unit. The control signal is used to notify the power control unit to cut off power supply of some service units in the communication device, so as to cut off the power supply of the some service units, thereby saving the static power consumption of the communication device.

The control signal unit includes an external control signal unit and/or an internal control signal unit, and the external control signal unit is used to receive a control signal from the outside of the communication device, and transmit the received control signal to the power control unit.

The internal control signal unit is used to generate a control signal using at least one part of the communication device including a main control module, an internal circuit module with independent power supply, an internal independent management module or a mechanical switch. The control signal is transmitted to the power control unit, that is, the source of the control signal transmitted to the power control unit comes from the main control module, the internal circuit module with independent power supply, the internal independent management module, and/or the mechanical switch.

The power control unit is used to cut off power supply of some service units in the communication device according to the control signal come from the control signal unit.

The power control unit includes a first power control unit for the whole communication device and/or a second power control unit for the service units.

The first power control unit for the whole communication device is set at the input point of the power supply of the communication device. The first power control unit is used to cut off power supply of some of the service units in the communication device according to the control signal come from the control signal unit.

The second power control unit for the service units is set at input point of the power supply of the service units of the communication device. The second power control is used to cut off power supply of the service units according to the control signal come from the control signal unit. The service units can be line cards in the communication device, or independent modules inside the line cards.

As an embodiment, in an IVD line card, the power control circuit is set at the input point of the power supply of the wideband circuit module and/or the narrowband circuit module of the line card. The specific implementation includes the following solutions.

(1) setting the power control circuit at the input point of the power supply of the wideband circuit module.

(2) setting the power control circuit at the input point of the power supply of the narrowband circuit module.

(3) setting the power control circuit at the input point of the power supply of the wideband circuit module and the narrowband circuit module simultaneously.

If the solutions (1) and (3) were used, the power control circuit is set at the input point of the power supply of the wideband circuit module, the control signal can come from the narrowband circuit module or other circuit modules with independent power supply inside the line card (including circuit modules with independent power supply inside the wideband circuit module). The whole or partial power supply of the wideband circuit module can be cut off according to the control signal from the narrowband circuit module or other circuit modules with independent power supply inside the line card (including the circuit module with independent power supply inside the wideband circuit module). The static power consumption is saved.

If the solution (2) and (3) were used, the power control circuit is set at the input point of the power supply of the narrowband circuit module, the control signal can come from the wideband circuit module or other circuit modules with independent power supply inside the line card (including circuit modules with independent power supply inside the narrowband circuit module). The power supply of the whole or partial narrowband circuit module may be cut off according to the control signal from the wideband circuit module or other circuit modules with independent power supply inside the line card (including circuit modules with independent power supply inside the narrowband circuit module). The static power consumption is saved.

The wideband circuit module inside the IVD line card mentioned-above refers to such service module as ADSL/ADSL2/ADSL2+/VDSL/VDSL2/G.SHDSL, and the narrowband circuit module inside the IVD line card mentioned-above refers to such circuit module as POTS/ISDN.

Figure 6:
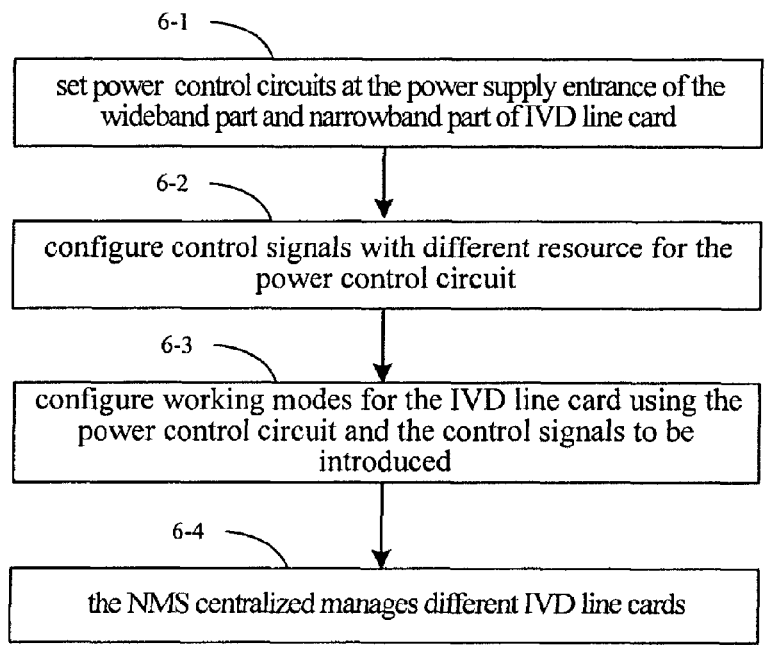
FIG. 6 is a flow chart of a method according to an embodiment of the present invention.

Taking the IVD line card (not limited to the IVD line card) as an embodiment, the method according to the embodiment of the present invention is shown in FIG. 6.

Block 6-1: Set a power control circuit at the input point of the power supply of the IVD line card.

The power control circuit includes the control signal unit and the power control unit, as described above.

According to the embodiment, power control circuits need to be set at the input point of the power supply of the wideband circuit module and at the input point of the power supply of the narrowband circuit module respectively; and the power control circuit set at the input point of the power supply of the wideband circuit module cut off power supply of the wideband circuit module, while the power control circuit set at the input point of the power supply of the narrowband circuit module cut off power supply of the narrowband circuit module.

Block 6-2: Configure control signals with different source for the power control circuit.

After the power control circuit is set at the input point of the power supply of the IVD line card, in the present embodiment, there are three implementations for setting the source of the control signals for the power control circuit.

Figure 7:
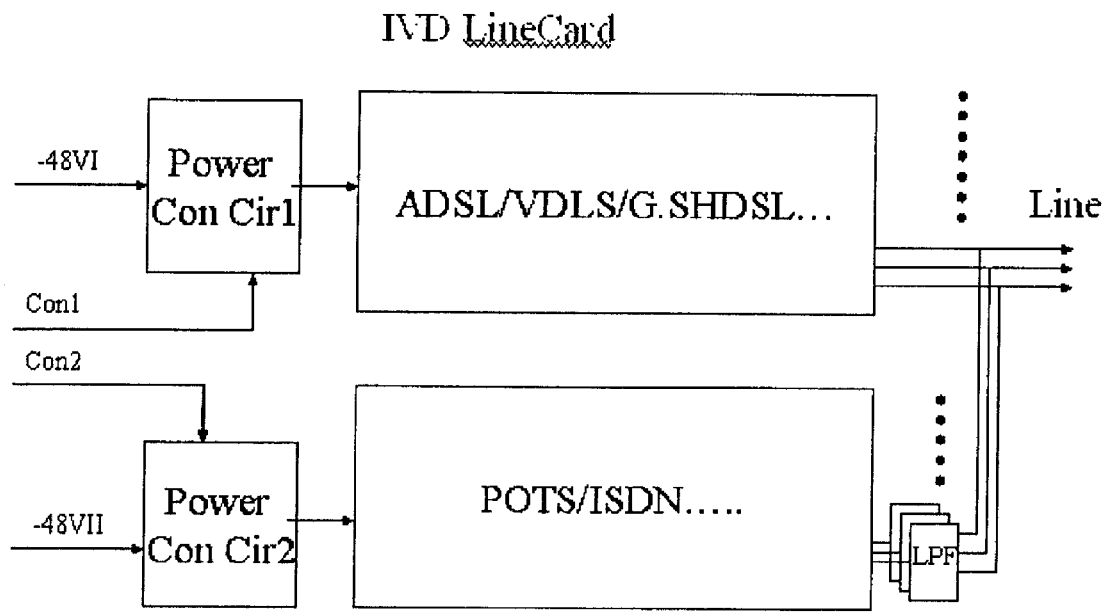
FIG. 7 is a schematic diagram illustrating the power supply control function of an IVD line card when power control signals come from outside the IVD line card.

In the first implementation, the control signals are from the outside of the line card, such as the system control module or other monitor modules. The system control module or other monitor modules transmits the control signals to the power control circuit through a backboard. The power supply control function of an IVD line card when power control signals come from outside of the IVD line card is illustrated in FIG. 7. A control signal con1 is derived from a first power control circuit Power Con Cir1, and a control signal con2 is derived from a second power control circuit Power Con Cir2. For example, the control signals from the backboard are used to cut off the whole or partial power supply of the wideband circuit module or the narrowband circuit module, so the static power consumption is saved. The control signal from the backboard is selectively derived from the system master control board, the system monitor board, other public management modules, other public monitor and other public management modules, other public monitor and control modules, or the like are controlled by a host computer command lines, or a management software systems such as Network Management System (NMS) graphical interfaces and the like. i.e. power supply for service units such as the wideband circuit module and so on can be controlled by the host computer command lines or the management software systems. In other words, whether the power of service units such as the wideband circuit module and the like is supplied by the power control circuit of input point of the power supply of service units such as the wideband circuit module and the like is controlled.

Figure 8:
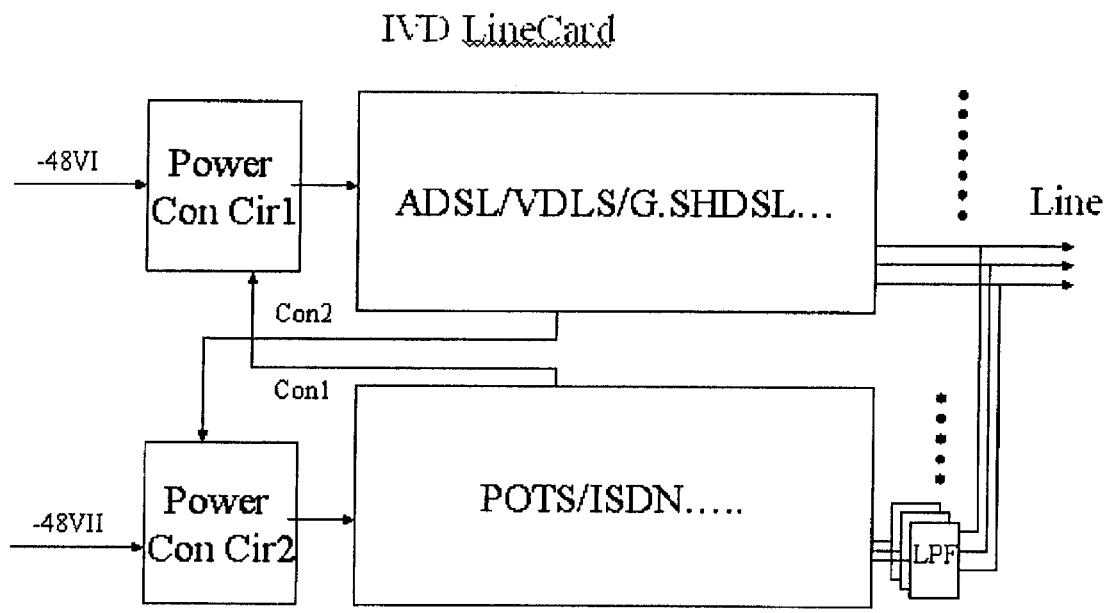
FIG. 8 is a schematic diagram illustrating the power supply control function of an IVD line card when power control signals for a wideband circuit module come from a narrowband circuit module, and power control signals for the narrowband circuit module come from the wideband circuit module.
Figure 9:
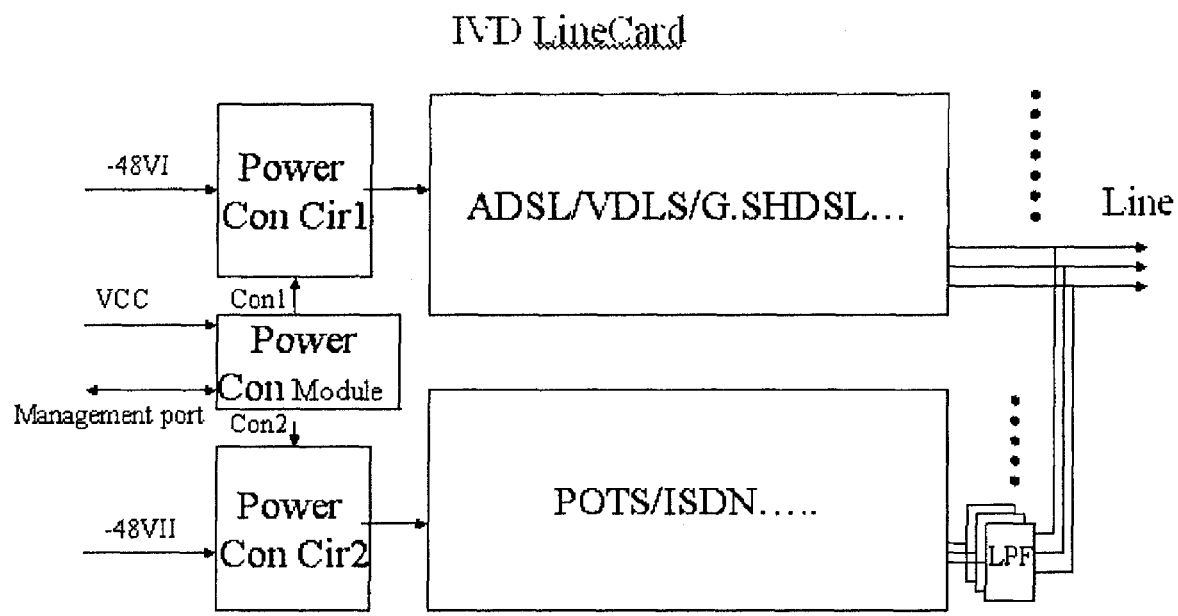
FIG. 9 is a schematic diagram illustrating the power supply control function of an IVD line card, when the power control signals for a wideband circuit module and a narrowband circuit module all come from an independent management module inside the line card.

In a second implementation, the control signals are derived from a different circuit module inside the line card, that is, the control signal for power supply of the wideband circuit module comes from the narrowband circuit module, while the control signal for power supply of the narrowband circuit module comes from the wideband circuit module. In this case, the power supply control function of the IVD line card is as shown in FIG. 8. Optionally, the control signals for power supply of the wideband circuit module and the narrowband circuit module all come from a same independent management module inside the line card. In this case, the power supply control function of the IVD line card is as shown in FIG. 9. In FIG. 8 and FIG. 9, the control signal come from the first power control circuit Power Con Cir1 is con1, the control signal come from the second power control circuit Power Con Cir2 is con2. The independent management module in FIG. 9 is a Power Con Module (power control module) configured with a Management Port.

Figure 10:
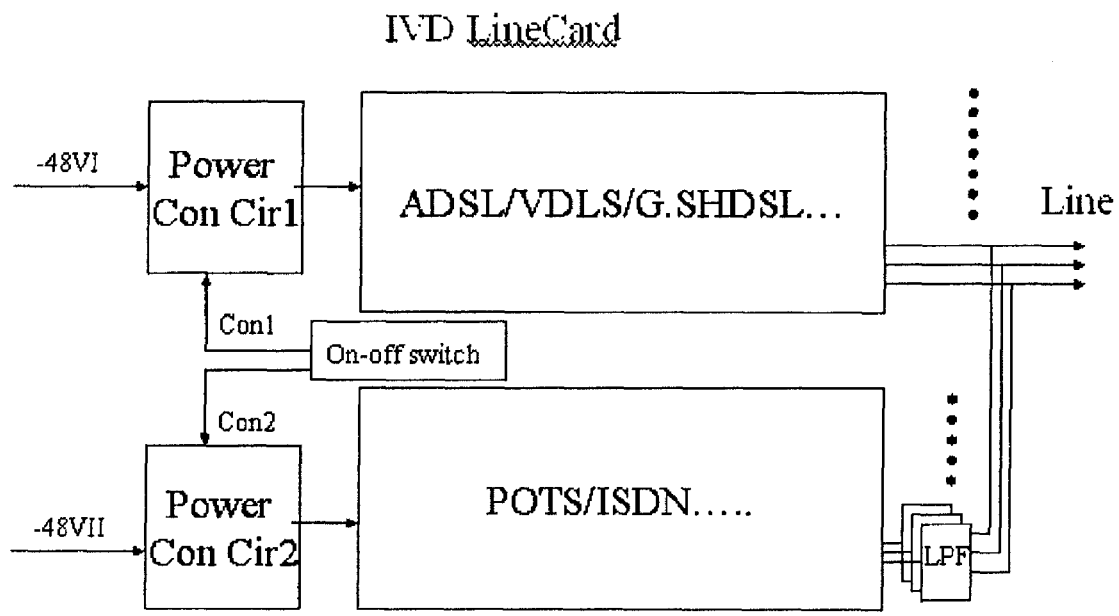
FIG. 10 is a schematic diagram illustrating the power supply control function of the IVD line card when power control signals come from a mechanical switch or a jump line.

In a third implementation, the control signals are derived from a mechanical switch or a jump line. In this case, the power supply control function of the IVD line card is shown in FIG. 10. Similarly, in FIG. 10, the control signal come from the first power control circuit Power Con Cir1 is con1, the control signal come from the second power control circuit Power Con Cir2 is con2, and the control signals are derived from an on-off Switch.

According to the embodiment of the present invention, at least one of the three above-mentioned sources of control signals may be chosen as the source of control signals introduced by the power control circuit.

Block 6-3: Configure working modes for the IVD line card using the power control circuit and the control signals to be introduced.

As shown in FIG. 7 to FIG. 10, the power input of the wideband circuit module is −48VI, that is converted to power needed by the wideband circuit module through Direct Current/Direct Current (DC/DC) conversion. The first power control circuit Power Con Cir1 is the power control circuit of the wideband circuit module. Control signals generated with one of the three above-mentioned manners may cut off the power supply of the wideband circuit module using the Power Con Cir1. Therefore, the static power consumption of the wideband circuit is reduced.

The power input of narrowband circuit module is −48VII, and the power input provides high-voltage power supply for the POTS feed-electricity circuit. The second power control circuit Power Con Cir2 is the power control circuit of the narrowband circuit module. Control signals generated in one of the three above-mentioned manners may cut off the power supply of the narrowband circuit module using the Power Con Cir2. Therefore, the static power consumption of the narrowband circuit is reduced.

Power Con Cir1 and Power Con Cir2 are independently with each other.

Figures 11, 12:
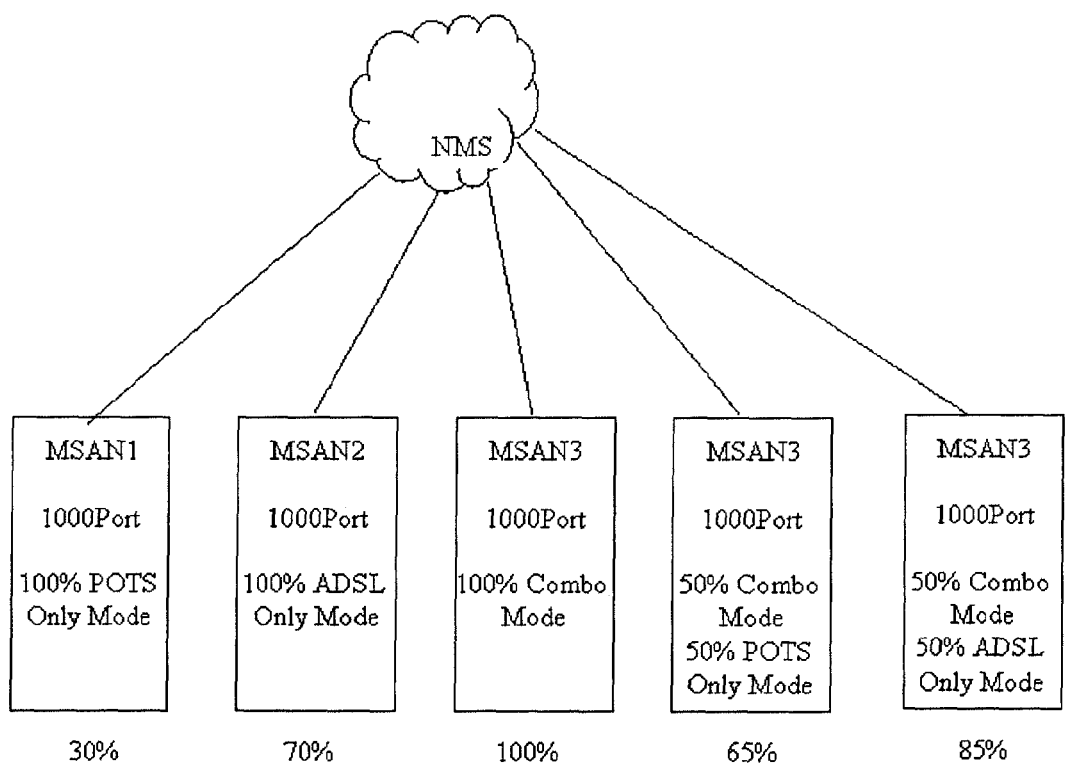
FIG. 11 is a schematic diagram illustrating the relationship between the working modes of the IVD line card and the logical relationship of the power control circuits.
FIG. 12 is a schematic diagram illustrating the centralized management of different IVD line cards by the NMS.

In the IVD line card shown in FIG. 7 to FIG. 10, the wideband circuit module or the narrowband circuit module of the IVD line card can be closed with application requirements, that is, the IVD line card is configured with different working modes using the configured power control circuit and control signals. FIG. 11 is the schematic diagram illustrating the relationship between working modes of the IVD line card and the logical relationship of the power control circuits.

As shown in FIG. 11, the power may be saved about 70% if the IVD line card is working in the POTS Only Mode, while the power may be saved about 30% if the IVD line card is working in the ADSL Only mode.

Block 6-4: The NMS uses the power control circuit to implement centralized management of different IVD line cards.

In this embodiment, the NMS can implement centralized management of the different IVD line cards through controlling the control signals transmitted to the power control circuit. That is, the NMS can configure ratios of working modes for IVD line cards according to the ratios occupied by the subscriber ports of the IVD line cards. Power consumption of the whole network can be reduced by the centralized management. FIG. 12 is a schematic diagram illustrating the centralized management. As shown in FIG. 12, power consumption of MSAN in different modes can be estimated, and more man 70% or the static power consumption may be saved.

The method according to the embodiments of the present invention may also be applied to other modules, line cards or devices.

The foregoing is only preferred embodiments of the present invention. The protection scope of the present invention, however, is not limited to the above description. Any change or substitution, within the technical scope disclosed by the present invention, easily occurring to those skilled in the art should be covered by the protection scope of the present invention. Therefore, the protection scope of the present invention should be according to the claims.

I claim:

1. A communication device, comprising:
  a plurality of service units; and
  a power control circuit, cutting off power supply of at least one service unit of the plurality of service units according to a control signal,
  wherein each of the plurality of service units is an independent circuit module in an Integrated Voice Data (IVD) line card,
  wherein the power control circuit further cuts off a power supply of a first circuit module in the IVD line card according to a control signal from a second circuit module in the IVD line card, and
  wherein the power control circuit is for cutting off power supply of a narrowband circuit module in the IVD line card according to a control signal from a wideband circuit module in the IVD line card.

2. The communication device of claim 1, wherein the power control circuit comprises:
  a control signal unit, transmitting the control signal; and
  a power control unit, cutting off power supply of at least one service unit of the plurality of service units according to the control signal transmitted from the control signal unit.

3. The communication device of claim 2, wherein the control signal unit comprises:
  an external control signal unit, receiving the control signal from outside of the communication device, and transmitting the control signal to the power control unit.

4. The communication device of claim 2, wherein the control signal unit comprises:
  an internal control signal unit, generating the control signal derived from at least one of a master control module in the communication device, an internal circuit module with independent power supply in the communication device, an internal independent management module in the communication device and a mechanical switch in the communication device, and transmitting the control signal to the power control unit.

5. The communication device of claim 2, wherein the power control unit comprises:
  a first power control unit for the whole communication device, set at an input point of the power supply of the communication device, cutting off power supply of the at least one service unit of the plurality of service units in the communication device according to the control signal from the control signal unit.

6. The communication device of claim 2, wherein the power control unit comprises:
  a second power control unit for a service unit of the plurality of the service units, set at an input point of the power supply of the service unit inside the communication device, cutting off power supply of the service unit according to the control signal from the control signal unit.

7. The communication device of claim 1, wherein the power control circuit is set at an input point of the power supply of the wideband circuit module in the IVD line card.

8. The communication device of claim 7, wherein the wideband circuit module comprises at least one of an Asymmetric Digital Subscriber Line (ADSL), ADSL2, ADSL2+, Very high rate ratio DSL (VDSL), VDSL2, and Single Line High Data Rate DSL (G.SHDSL) service modules.

9. The communication device of claim 1, wherein the power control circuit is set at an input point of the power supply of the narrowband circuit module in the IVD line card.

10. The communication device of claim 9, wherein the narrowband circuit module comprises at least one of a plain old telephone service (POTS) and an Integrated Service Digital Network (ISDN) circuit module.

11. A method for saving static power consumption of a communication device, comprising:
  receiving a control signal;
  cutting off power supply of at least one service unit in the communication device according to the control signal,
  wherein the service unit is an Integrated Voice Data (IVD) line card in the communication device or an independent circuit module in the IVD line card
  wherein the control signal is derived from a wideband circuit module in the IVD line card, and
  wherein cutting off the power supply of at least one service unit in the communication device according to the control signal comprises: cutting off the power supply of a narrowband circuit module in the IVD line card according to the control signal from the wideband circuit module.

12. The method of claim 11, wherein the control signal is derived from a mechanical switch or a jump line in the IVD line card.

13. A method for saving static power consumption of a communication device, comprising:
receiving a control signal;
cutting off power supply of at least one service unit in the communication device according to the control signal,
wherein the service unit is an Integrated Voice Data (IVD) line card in the communication device or an independent circuit module in the IVD line card,
wherein the control signal is from a narrowband circuit module in the IVD line card, and
wherein cutting off the power supply of at least one service unit in the communication device according to the control signal comprises: cutting off the power supply of a wideband circuit module in the IVD line card according to the control signal from the narrowband circuit module.

14. The method of claim 13, wherein the control signal is derived from a mechanical switch or a jump line in the IVD line card.

15. A communication device, comprising:
a plurality of service units; and
a power control circuit, cutting off power supply of at least one service unit of the plurality of service units according to a control signal,
wherein each of the plurality of service units is an independent circuit module in an Integrated Voice Data (IVD) line card,
wherein the power control circuit further cuts off a power supply of a first circuit module in the IVD line card according to a control signal from a second circuit module in the IVD line card, and
wherein the power control circuit is for cutting off power supply of a wideband circuit module in the IVD line card according to a control signal from a narrowband circuit module in the IVD line card.

16. The communication device of claim 15, wherein the power control circuit comprises:
a control signal unit, transmitting the control signal; and
a power control unit, cutting off power supply of at least one service unit of the plurality of service units according to the control signal transmitted from the control signal unit.

17. The communication device of claim 16, wherein the control signal unit comprises:
an external control signal unit, receiving the control signal from outside of the communication device, and transmitting the control signal to the power control unit.

18. The communication device of claim 16, wherein the control signal unit comprises:
an internal control signal unit, generating the control signal derived from at least one of a master control module in the communication device, an internal circuit module with independent power supply in the communication device, an internal independent management module in the communication device and a mechanical switch in the communication device, and transmitting the control signal to the power control unit.

19. The communication device of claim 16, wherein the power control unit comprises:
a first power control unit for the whole communication device, set at an input point of the power supply of the communication device, cutting off power supply of the at least one service unit of the plurality of service units in the communication device according to the control signal from the control signal unit.

20. The communication device of claim 16, wherein the power control unit comprises:
a second power control unit for a service unit of the plurality of the service units, set at an input point of the power supply of the service unit inside the communication device, cutting off power supply of the service unit according to the control signal from the control signal unit.

21. The communication device of claim 15, wherein the power control circuit is set at an input point of the power supply of the wideband circuit module in the IVD line card, and wherein the wideband circuit module comprises at least one of an Asymmetric Digital Subscriber Line (ADSL), ADSL2, ADSL2+, Very high rate ratio DSL (VDSL), VDSL2, and Single Line High Data Rate DSL (G.SHDSL) service modules.

22. The communication device of claim 15, wherein the power control circuit is set at an input point of the power supply of the narrowband circuit module in the IVD line card, and wherein the narrowband circuit module comprises at least one of a plain old telephone service (POTS) and an Integrated Service Digital Network (ISDN) circuit module.

* * * * *